United States Patent [19]

Bayer

[11] Patent Number: 4,561,022
[45] Date of Patent: Dec. 24, 1985

[54] IMAGE PROCESSING METHOD BASED ON PROCESSING OF INTERRELATED IMAGE GRADIENTS

[75] Inventor: Bryce E. Bayer, Rochester, N.Y.
[73] Assignee: Eastman Kodak Company, Rochester, N.Y.
[21] Appl. No.: 522,286
[22] Filed: Aug. 11, 1983
[51] Int. Cl.[4] .................. H04N 5/213; H04N 5/14; H04N 5/208
[52] U.S. Cl. ............................ 358/167; 358/166; 382/54
[58] Field of Search ................. 358/166, 167; 382/54

[56] References Cited

U.S. PATENT DOCUMENTS

| | | | |
|---|---|---|---|
| 3,621,129 | 11/1971 | Fisher | 178/6.8 |
| 4,055,756 | 10/1977 | Jolivet | 364/725 |
| 4,220,972 | 9/1980 | Geokezas | 358/166 |
| 4,231,065 | 10/1980 | Fitch | 358/166 |
| 4,334,244 | 6/1982 | Chan et al. | 358/166 |
| 4,399,461 | 8/1983 | Powell | 382/53 X |
| 4,446,484 | 5/1984 | Powell | 358/166 |
| 4,463,381 | 7/1984 | Powell | 358/166 |

FOREIGN PATENT DOCUMENTS

| | | | |
|---|---|---|---|
| 0076380 | 4/1983 | Fed. Rep. of Germany | 358/280 |
| 1557173 | 12/1979 | United Kingdom | |

OTHER PUBLICATIONS

"Digital Techniques of Reducing Television Noise," by J. P. Rossi, *Journal of the Society of Motion Picture and Television Engineers*, Mar. 1978, pp. 134–140.

"A Method for the Digital Enhancement of Unsharp, Grainy Photographic Images," by P. G. Powell and B. E. Bayer, *Proceedings of the International Conference on Electronic Image Processing*, Jul. 26–28, 1982, pp. 179–183.

*Primary Examiner*—Michael A. Masinick
*Assistant Examiner*—E. Anne Toth
*Attorney, Agent, or Firm*—David M. Woods

[57] ABSTRACT

An improved image processing method prevents unwanted processing artifacts from degrading the reproduction of an image by stressing the interrelationship of various image gradients in the image. Image signals are generated representative of the light value of elements of the image. A local gradient signal is generated in response to a combination of image signals representative of an image gradient over a local portion of the image. An extended gradient signal is also generated representative of an image gradient over an image portion greater than the local portion. The image gradients are interrelated in a composite signal generated from a combination of the local and extended gradient signals. As an example of the combination, the composite signal is made to vary as a function of the difference between the gradient signals. The image signals are then modified subject to a characteristic of the composite signal, e.g., the magnitude of the composite signal.

14 Claims, 6 Drawing Figures

IMAGE PROCESSING METHOD BASED ON PROCESSING OF INTERRELATED IMAGE GRADIENTS

BACKGROUND OF THE INVENTION

1. Field of the Invention

The invention relates to image processing methods for reducing noise in a sampled image. More specifically, the invention pertains to an image processing method which reduces noise while minimizing unintended distortion of image features.

2. Description Relative to the Prior Art

Pictures generated by an image processing method often display artifacts introduced by the processing method itself. Such artifacts may mask the benefits obtained by processing the image. This invention pertains to the suppression of a particular class of artifacts: the introduction of what appear to be "edges" into places—like smooth facial features—where no such edges existed in the original image. To better describe the invention it is necessary to review certain aspects of known image processing technology.

In known image processing methods, every image signal is replaced by a modified value, based on the values of the image signals from a surrounding field of image elements. The signals from the surrounding field are used to form a number of different linear combinations each of which represents a different component of the image structure within the field. In a typical method, most of the combinations represent the detail within the field. Each detail-sensitive combination represents a difference among local image signals and tends to vanish in the absence of a particular kind of image detail. Noise is reduced by modifying the detailsensitive combinations such that, for example, the value of a combination is lowered or set to zero wherever a particular kind of image detail is not present.

One such method, hereinafter referred to as a point-neighborhood method, considers the signal representative of the light value of each original image element in combination with similar signals from a small neighborhood of surrounding elements. (Light value, as used herein, shall mean any imagerelated characteristic—e.g., lightness, brightness, image density, hue and the like—that can be expressed in a form suitable for image processing.) The point-neighborhood method reconstitutes the image by replacing the signal from each original image element with the sum of a number of linear combinations of the neighborhood signals. The general plan of such a method is to 1) generate image signals representative of light values by sampling the image according to a regular array of picture elements, 2) filter the image signals to obtain a low-pass and one or more band-pass image signals (one of which may be high-pass) 3) core each band-pass signal by comparison to a threshold to remove noise, 4) amplify the cored band-pass signals to increase sharpness, and 5) add the amplified, cored band-pass signals to the low-pass signal to obtain a final image for display or reproduction. (Coring is a non-linear noise reduction process that removes signal energy—presumably noise—near the average signal axis and less than a threshold; the remaining signal is then added back to the low-pass signal. See "Digital Techniques of Reducing Television Noise," by J. P. Rossi, *Journal of the Society of Motion Picture and Television Engineers*, March 1978, pp. 134–140. A complementary process, hereinafter referred to as clipping, removes signal energy—presumably image detail—that is above a threshold; the remaining noise signal is then subtracted from the full-band signal.)

One version of a point-neighborhood method divides the image into (A) a low-pass image signal obtained by convolving the original image with 1/16 of a 3 by 3 array of weights such as

| | | | |
|---|---|---|---|
| 1 | 2 | 1 | (1) |
| 2 | 4 | 2 | |
| 1 | 2 | 1 | | and (B) a high-pass image signal composed of eight high-pass component signals obtained by convolving the original image with 1/16 of a combination of eight 3 by 3 arrays of weights such as

| | | | | | | | | | | | | |
|---|---|---|---|---|---|---|---|---|---|---|---|---|
| 0 0 | 0 | −1 0 | 0 | 0 −2 | 0 | 0 0 | −1 | (2) |
| −2 2 | 0 | 0 1 | 0 | 0 2 | 0 | 0 1 | 0 | |
| 0 0 | 0 | 0 0 | 0 | 0 0 | 0 | 0 0 | 0 | |
| 0 0 | 0 | 0 0 | 0 | 0 0 | 0 | 0 0 | 0 | |
| 0 2 | −2 | 0 1 | 0 | 0 2 | 0 | 0 1 | 0 | |
| 0 0 | 0 | 0 0 | −1 | 0 −2 | 0 | −1 0 | 0 | |

Each high-pass image component signal is proportional to the image gradient in a particular direction. A sharpened image of reduced noise is obtained by coring each high-pass component signal, amplifying each cored high-pass component signal and adding the amplified component signals to the low-pass signal. Such point-neighborhood processing methods are described in (A) commonly assigned copending patent application Ser. No. 357,357, entitled "Electronic Image Processing," filed Mar. 12, 1982 as a continuation of patent application Ser. No. 192,954, filed May 28, 1980 and (B) "A Method for the Digital Enhancement of Unsharp, Grainy Photographic Images," by P. G. Powell and B. E. Bayer, *Proceedings of the International Conference on Electronic Image Processing*, July 26–28, 1982, pp. 179–183.

The known method thus far described removes noise of very high frequency and responds only to local aspects of an image gradient, whether in fact the overall gradient is local or extended. In order to process lower frequency noise in a point-neighborhood method, an even lower-pass signal is obtained in a second stage by convolving the low-pass signal of the initial stage heretofore described with 1/16 of a 5 by 5 array of weights such as

| | | | | |
|---|---|---|---|---|
| 1 | 0 | 2 | 0 | 1 | (3) |
| 0 | 0 | 0 | 0 | 0 |
| 2 | 0 | 4 | 0 | 2 |
| 0 | 0 | 0 | 0 | 0 |
| 1 | 0 | 2 | 0 | 1 |

Just as eight high-pass, or fine detail, image component signals were obtained from the original image, eight band-pass, or intermediate detail, image component signals are now obtained from the low-pass signal by convolving that signal with 1/16 of a combination of eight 5 by 5 arrays of weights, such as

| | | | | | | | | |
|---|---|---|---|---|---|---|---|---|
| 0 0 0 0 | 0 | −1 0 0 0 | 0 | 0 0 −2 0 0 | 0 0 0 0 −1 | (4) |
| 0 0 0 0 | 0 | 0 0 0 0 | 0 | 0 0 0 0 0 | 0 0 0 0 0 | |
| −2 0 2 0 | 0 | 0 0 1 0 | 0 | 0 0 2 0 0 | 0 0 1 0 0 | |

-continued

| 0 0 0 0 | 0  | 0 0 0 0 | 0  | 0 0 | 0 0 0  | 0 0 0 0 | 0 |
|---------|----|---------|----|-----|--------|---------|---|
| 0 0 0 0 | 0  | 0 0 0 0 | 0  | 0 0 | 0 0 0  | 0 0 0 0 | 0 |
| 0 0 0 0 | 0  | 0 0 0 0 | 0  | 0 0 | 0 0 0  | 0 0 0 0 | 0 |
| 0 0 0 0 | 0  | 0 0 0 0 | 0  | 0 0 | 0 0 0  | 0 0 0 0 | 0 |
| 0 0 2 0 | −2 | 0 0 1 0 | 0  | 0 0 | 2 0 0  | 0 0 1 0 | 0 |
| 0 0 0 0 | 0  | 0 0 0 0 | 0  | 0 0 | 0 0 0  | 0 0 0 0 | 0 |
| 0 0 0 0 | 0  | 0 0 0 0 | −1 | 0 0 | −2 0 0 | −1 0 0 0 | 0 |

As before, each band-pass image component signal is proportional to the average gradient in a particular direction, but now the result is taken over a larger area. These image component signals are cored and summed with the lower-pass signal to produce a smoothed version of the original low-pass signal, which is then added to the processed high-pass image component signals from the initial, or first, stage (such cascading procedures are described in the previously cited Powell and Bayer article and in commonly assigned, copending patent applications Ser. Nos. 328,543 and 328,544, both entitled "Electronic Image Processing" and both filed Nov. 30, 1981.) This process can be cascaded any number of times until removing noise of lower frequency yields little further improvement.

In the above-described point-neighborhood method, noise is reduced by coring (or clipping) the detail-sensitive linear combinations of the image signals. Since the noise coring process involves the application of a non-linear function (e.g., a threshold), some distortion of local image values may be generated as an artifact of the processing itself, but this is tolerated in order to realize the desired noise reduction. For example, none of the gradient-sensitive weighting arrays heretofore discussed will generate component signals that respond to the abrupt change of a low contrast edge without also responding to a gradual change in a smooth, extended image gradient—such as is frequently found within smooth areas of scene objects. A local gradient (i.e., a low contrast edge) and an extended gradient may thus "look" the same to a weighting array that encompasses only the local field.

The non-linear coring procedure is in part justified by the assumption that transition between the cored and non-cored states is mostly acceptable in a "busy" region of the image, as at an edge. The problem arises where the local and extended gradients appear the same, that is, in certain less "busy" regions of an image where the light value is changing only smoothly and slowly. In such regions the value of one or more of the detail-sensitive linear combinations will pass through its noise threshold. Because this situation activates the coring procedure, an abrupt discontinuity will undesirably appear in the processed image at the point where the threshold is crossed and the corresponding linear combination is undesirably modified. In less "busy" regions—like the smoothed area of an extended gradient—this transition sometimes leads to a visible artifact—much like an "edge"—and therefore is undesirable. From an aesthetic viewpoint, such artifacts particularly detract from the overall visual appeal of images reproduced by such methods. In fact, in some areas of an image such transitions may be more objectionable than the original noise component that coring has removed. Point-neighborhood methods of which I am aware are unable to effectively deal with these types of artifacts, therefore yielding aesthetically unappealing results. My invention provides a solution for this type of problem.

SUMMARY OF THE INVENTION

The multi-stage point-neighborhood method has some linear combinations that respond to gradients in a small area of an image and others that respond to gradients in a larger area. I have found that by processing signals based on an interrelationship of these image gradients, rather than by separately processing those based on local gradients, greater immunity to annoying discontinuities such as "false edges" can be obtained.

The invention thus pertains to a method of image processing especially arranged to stress the interrelationship of various image gradients existing in an image. Initially, image signals are generated that are representative of the light value of elements of the image. Then a first gradient signal is generated in response to a combination of image signals representative of an image gradient over a first portion of the image. Another gradient signal is generated representative of an image gradient over a second image portion that is greater than the first image portion. A composite signal is generated by combining the two gradient signals. The image signals are then modified in response to a characteristic of the composite signal. The application of this method in connection with an image having both gradual, extended gradients and low-contrast local gradients (e.g., low-contrast edges) prevents unwanted processing artifacts—such as "false edges"—from degrading the reproduction of such portions of the image.

The composite signal is based on the generation of local and extended gradient signals in one case of a point-neighborhood method. The local gradient signal is representative of image gradients obtained from various image signals that correspond to image elements distributed in nearby locations while the extended gradient signal similarly derives from elements distributed more widely over the image. The composite signal is then made to vary as a function of the difference between the gradient signals; the magnitude of the thus-varying composite signal is compared to a threshold and the image signals are modified based on the outcome of this comparison.

BRIEF DESCRIPTION OF THE DRAWINGS

The invention will be described with reference to the figures, wherein.

DETAILED DESCRIPTION OF THE PREFERRED EMBODIMENTS

The input signal in the following description is generated by the scanning and sampling of an original image. For purposes of describing the preferred embodiments the input signal is assumed to be generated from an image such as a negative or positive photographic transparency. It is further understood that such a signal may represent a variety of spatial components of the image, including an average light value level, fine detail such as fine edges, lines and textures; intermediate detail such as broader edges and small features; and coarse detail such as shaded modeling and other gradually varying features. (Modeling as here used refers to the rendition of smoothly varying features or details.) In addition, the signal includes a noise component affecting most of the spatial components to some degree. With a photographic transparency, much of such noise originates with the random distribution of the light-absorbing particles that form the basis of this image-recording system. While the invention will be described in connection with sampled data from a photographic transparency, it should be understood that the input signal can represent other information or data, such as would be derived from directly scanning an object, from a composite video signal, or from image information in optical/electrical/magnetic storage. In such cases the noise originates in other characteristics of the signal generating system.

Figure 1:
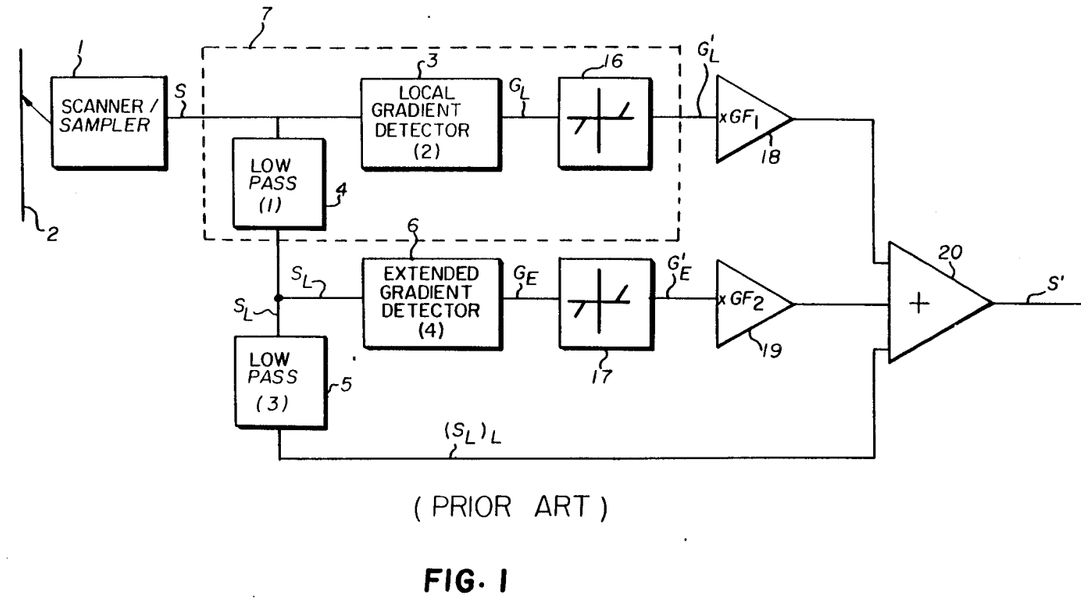
FIG. 1 is a block diagram of a two-stage point-neighborhood method known in the prior art.

A block diagram of a known two-stage point-neighborhood method is shown in FIG. 1. Conventional scanning and sampling apparatus 1 generates a stream of image signals by scanning a photographic negative 2. Each signal relates to the light value of a respective element of an original image. This signal stream, hereinafter called signal S, is presented in a first stage to a local gradient detector 3 and to a low-pass prefilter 4. The prefilter 4 convolves the signal S with the low-pass weighting array (1), heretofore described in relation to the prior art. The low-pass signal $S_L$ is then presented in a second stage to a further low-pass filter 5 and to an extended gradient detector 6. The two gradient detectors 3 and 6, acting as filters, convolve the image signal S and the low-pass signal $S_L$ with selected arrays of weights (i.e., sets of filter coefficients) sensitive to local and extended gradients, respectively. The arrays (2) and (4) described heretofore in relation to the prior art are suitable for generating respective local and extended gradient signals $G_L$ and $G_E$, which are proportional to local and extended image gradients. The signals $G_L$ and $G_E$ are then processed by respective non-linear noise modification circuits 16 and 17, which suppress signal energy less than a predetermined threshold and put out respective cored signals $G_L'$ and $G_E'$. The coring procedure mentioned heretofore in relation to the prior art is suitable for the noise modification circuits 16 and 17. The cored signals $G_L'$ and $G_E'$ are then separately amplified in respective amplifiers 18 and 19, which apply respective gain factors $GF_1$ and $GF_2$ to the cored signals. The low-pass signal needed to complete the processing is obtained in the low-pass filter 5 by convolving the low-pass signal generated by the array (1) with the 5 by 5 array (3) to generate a second, lower-pass signal component $(S_L)_L$. The final noise-reduced image signal S' is formed in a summer 20 by summing the lower-pass signal component $(S_L)_L$ with the cored and amplified local gradient signal $G_L'$ and the cored and amplified extended gradient signal $G_E'$.

Figure 2:
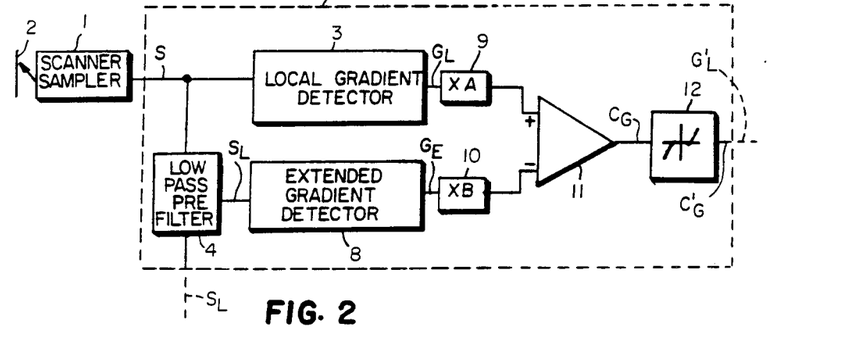
FIG. 2 is a block diagram of an improved image processing method employing gradient detectors in accordance with the invention. as applied to a point-neighborhood method of the kind shown in FIG. 1.

FIG. 2 illustrates the principle of the invention as applied to the point-neighborhood method illustrated by FIG. 1. In particular, the part of the block diagram of FIG. 2 enclosed in broken line 7 replaces the part of the block diagram of FIG. 1 likewise enclosed in broken line 7. The signal S is presented to the local gradient detector 3 and the low-pass prefilter 4. As was the case in FIG. 1, the prefilter 4 convolves the signal S with the low-pass weighting array (1). However, an additional output is taken from the prefilter 4 and the low-pass signal $S_L$ is presented to an additional extended gradient detector 8. The gradient detectors 3 and 8, acting as filters, convolve the image signal S and the low-pass signal $S_L$ with selected arrays of weights (i.e., sets of filter coefficients, such as arrays (2) and (4)) sensitive to local and extended gradients, respectively. In so doing, the gradient detectors generate respective local and extended gradient signals $G_L$ and $G_E$, which are proportional to local and extended image gradients. The signals $G_L$ and $G_E$ generated by the detectors 3 and 8 are multiplied by the proportionality factors A and B in respective conventional multiplying circuits 9 and 10. The signals put out by the circuits 9 and 10 are proportional to local and extended image gradients, respectively. In accordance with the invention, these signals—and the gradients they represent—are related to each other in a signal combining circuit, such as, for example, a conventional differencing circuit 11. The difference circuit 11 produces a composite gradient signal $C_G$ that varies as a function of the difference between the signals $G_L$ and $G_E$, i.e., a signal $CG=(A*G_L-B*G_E)$.

The composite subtraction signal $C_G$ is processed by a non-linear noise modification circuit 12, which provides an output based on a particular characteristic of the signal $C_G$. For example, the coring procedure mentioned heretofore in relation to the prior art is a suitable procedure for the noise modification circuit 12; signal energy less than a predetermined threshold is suppressed and a cored signal $C_G'=(A*G_L-B*G_E)'$ is generated. However, rather than—as in FIG. 1—coring the gradient signals separately, the coring procedure is applied to an image signal resulting from an interrelation or comparison (i.e., as by subtraction) of image gradients of different extent.

The method thus far described removes noise of high frequency in regions where the underlying local gradient signal differs little from the underlying extended gradient signal. For example, the difference between the gradient signals should vanish if the underlying image variation is smooth and continuous. It will not vanish if the gradient is strictly localized, as at an edge. In both cases, noise will be included in the difference between the gradient signals. By coring this difference, instead of the individual gradient signals, the image signal S will be uniformly treated in extended, smoothly varying areas. In particular, the local gradient detector will not by itself introduce the artifact of "false edges" in the midst of the smoothly varying area because the local gradient signal will not by itself be subjected to a noise threshold. In effect, the "correct" local gradient for a smoothly varying area is predicted by reference to the extended gradient. That is, the local gradient should not trigger an edge decision unless its value significantly differs (by an amount exceeding the coring threshold) from its "predicted edge-less" value, i.e., the value one would expect by looking at the extended gradient in the same area. The net effect of this method is the suppression of the artifact of "false edges" heretofore described.

In other respects, the final image is reconstructed from the individual image signals as in the known method described by the block diagram of FIG. 1. The method of the invention as described to this point removes noise of high frequency without introducing the "false edge" artifact. Separately coring the extended gradient signal by itself in the noise modification circuit 17 removes noise of lower frequency, providing a cored extended gradient signal $G_E'$. The final noise-reduced image is formed by summing the lower-pass signal $(S_L)_L$ with the cored extended gradient signal $G_E'$ and with the core composite signal $C_G'$. In generating $C_G'$, the proportionality factors A and B are usually chosen so as to generate a zero signal difference ($C_G'=0$) when the local and extended gradient signals $G_L$ and $G_E$ are obtained from a smoothly varying image area where the local image gradient is equal to the extended image gradient. For an accurate reconstruction of the original image, but with reduced noise, the cored gradient signal $G_E'$ (put out by circuit 17 of FIG. 1) is then sufficiently multiplied to account for the proportion of the signal $G_E$ subtracted during the generation of $C_G'$. For example (with A=1), the exact reconstruction will involve $$(S_L)_L + (1+B)G_E' + (G_L - B^*G_E)'$$

where the signal $G_E'$ has been multiplied by proportionality constant (1+B) to make up for the loss of a proportion (B) of $G_E$ in the signal $C_G'$. Adjustment of the gain factor $GF_2$ of the amplifier 19 is a suitable way to perform this multiplication.

Figure 3:
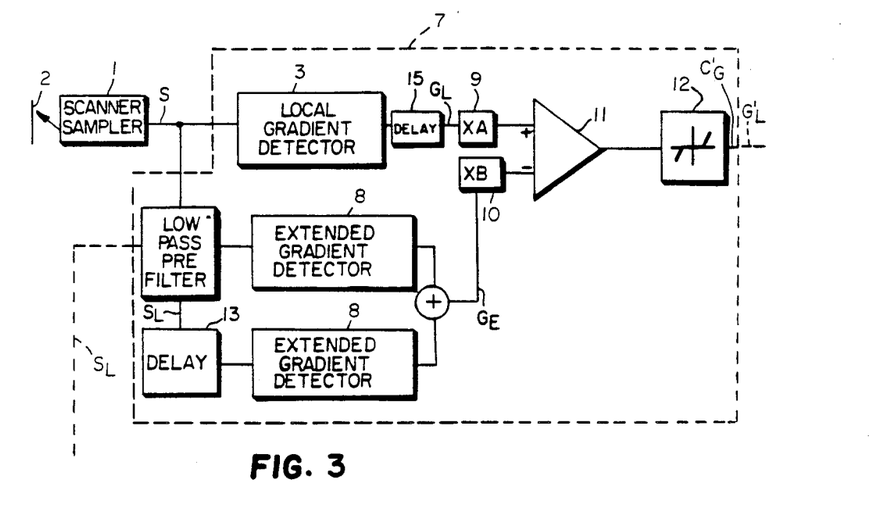
FIG. 3 is a block diagram of a modification made to the improved method illustrated in FIG. 2 in order to align the gradient detectors relative to the same image element.

It is further desirable to modify the extended gradient signal $G_E$ when it is not possible to align the gradient detectors 3 and 8 relative to the same image element. For example, the horizontal weight "−220" from array (2)—taking only the central string of the weighting array—does not exactly center on a gradient the same as the horizontal weight "−20200" from array (4). They are off by one-half element. Therefore, it has been my practice to subtract from the local gradient the average of two extended gradients offset by one element. FIG. 3 illustrates the application of this averaging process to the arrangement of FIG. 2. Two extended gradient detectors 8 are employed; each may implement the same form of the array (4) if a delay 13 of, for example, one image element is provided prior to one of the detectors. A suitable delay element 15 is also included to delay the signal $G_L$ so that it is in time-wise alignment with the averaged $G_E$ signal.

This procedure may be cascaded through further stages in order to remove noise of yet lower frequency without introducing the "false edge" artifact. For example, in a third stage a third, still lower-pass image signal and eight coarse-detail image signals can be formed from the second, lower-pass image signal. Such a cascading procedure is described in the heretofore cited patent applications, Ser. Nos. 328,543 and 328,544, and the Powell and Bayer article. Furthermore it is well-known to form the second and third low-pass signals directly from the original image signals, as discussed, for example, in the Powell and Bayer article. If a third stage is implemented, then the coarse-detail image signals (actually, more widely or further extended image gradients) are available for comparison with the medium-detail extended gradient signals in the second stage in a manner in accordance with the invention.

Figure 4:
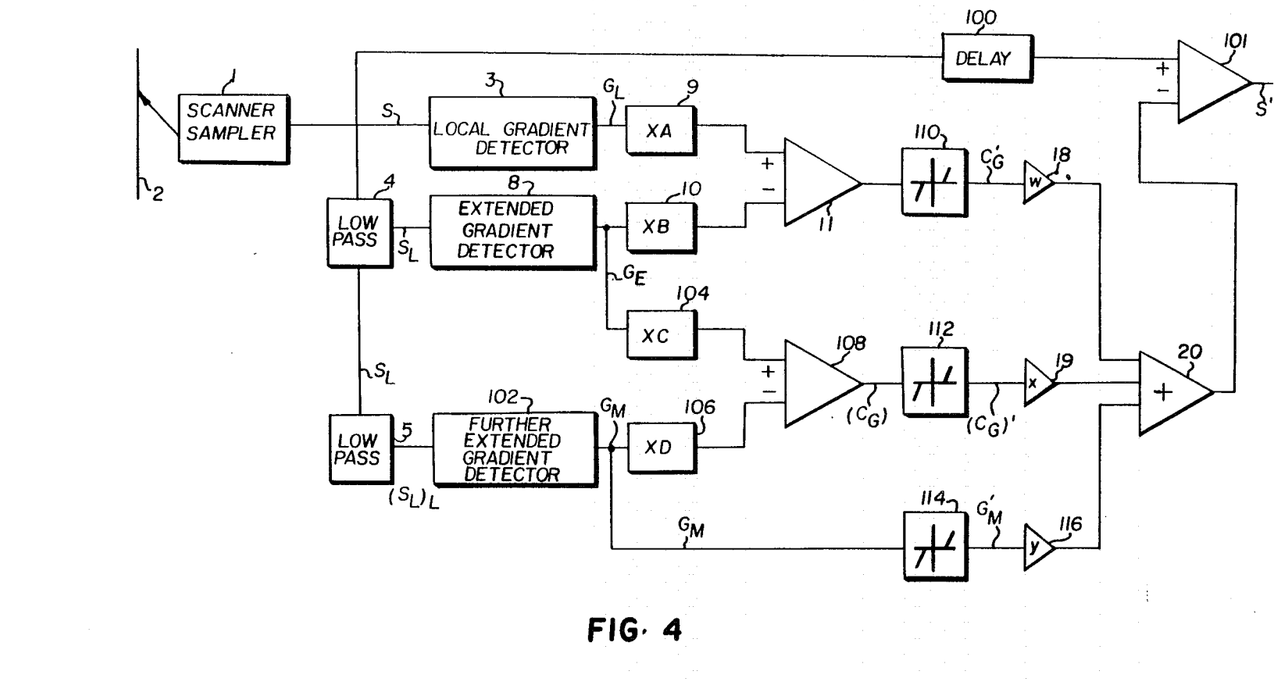
FIG. 4 is a block diagram of a three-stage point-neighborhood method employing the improved image processing method in accordance with the invention.

FIG. 4 is a block diagram of a point-neighborhood process incorporating the principles of the invention in a three stage operation. This figure also shows the use of a clipping type of noise reduction, instead of the coring type shown in the preceding figures. Similar reference characters are used to indicate blocks that are similar to those described in connection with FIGS. 1 and 2. The differences are as follows. The stream of unfiltered image signals S is additionally presented to a delay circuit 100 and therefrom to a difference circuit 101, from which the noise-reduced image signal S' is generated. The low-pass signal $(S_L)_L$ is also presented to a further extended gradient detector 102 for generating a further extended gradient signal $G_M$, which is proportional to further extended image gradients. (A set of weights based on a straight-forward extension of the array (4) is suitable for generating the signal $G_M$.)

The gradient signal $G_M$ is then made available for interrelationship with the gradient signal $G_E$ in the second stage in accordance with the invention. The signal $G_M$ and the extended gradient signal $G_E$ are multiplied by proportionality factors C and D in respective multiplying circuits 104 and 106. The signals provided by the circuits 104 and 106 are presented to a difference circuit 108, which generates a second stage composite signal ($C_G$). The composite signals $C_G$ and ($C_G$) are clipped in respective clipping circuits 110 and 112, which suppress signal energy above a designated threshold, leaving clipped composite signals $C_G'$ and $(C_G)'$ composed mainly of noise. At the next stage of processing the further extended gradient signal $G_M$ is clipped by another clipping circuit 114 and amplified in an amplifier 116. The final noise-reduced image is formed by summing the clipped and amplified signals $C_G'$, $(C_G)'$ and $G_M'$ and subtracting the summed result—which is mainly noise—from the full-band signal S in the difference circuit 101. The delay circuit 100 provides suitable delay to the signal S such that it is properly aligned with respect to the picture element represented by the output of the summer 20. As before, compensation for off-centered gradients is handled (but not shown in FIG. 4) by subtracting from the extended gradient the average of two offset further extended gradients.

Despite the beneficial results, there is a trade-off in using such a procedure in accordance with the invention. Low-contrast detail suffers in comparison to the output from cascaded procedures based on the coring of the local gradient signal by itself. However, the advantage in reduction of unwanted artifact is deemed worth the cost. (Various compromises are possible. For example, the aforementioned proportionality factor B—and-/or D—can be reduced, leaving more of the artifact but increasing low contrast sharpness.)

Figure 5:
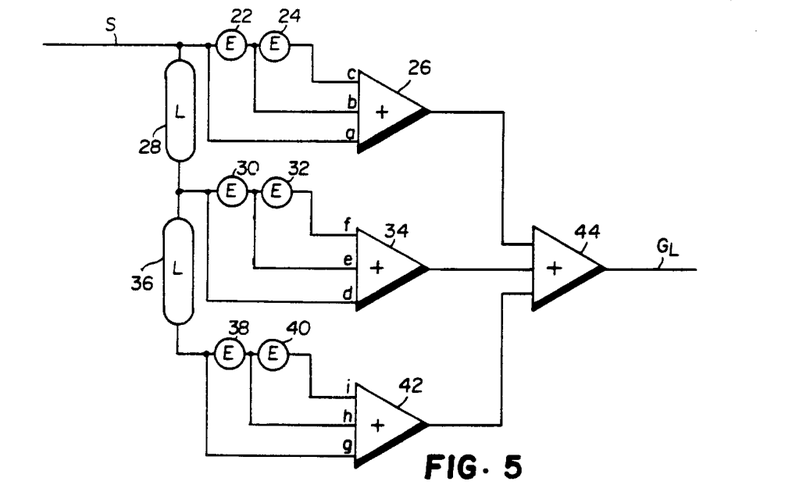
FIG. 5 is a circuit diagram of a network for implementing the local gradient detector of FIGS. 2 and 3.

Circuit elements for implementing the local gradient detector 3 are shown in the network of FIG. 5, which aligns the incoming signals into signal arrays corresponding to elements within particular areas of the image and then processes the signal arrays in accordance with a particular gradient-sensitive pattern. The incoming stream of image signals S are applied to a one-element delay 22 and to a one-line delay 28. The one-element delayed signal is applied to another one-element delay 24, then forming a two-element delayed signal. The undelayed, the one-element delayed and the two-element delayed signals are each applied to the summing amplifier 26, which has coefficients a, b and c for weighting the sum. The summed output signal (allowing for plus and minus coefficient operations) forms one image line of the gradient detector output. Similarly the one-line delayed signal from delay 28 is applied to another one-line delay 36 and to a summing amplifier 34 (having weighting coefficients d, e and f) by way of the one-element delays 30 and 32, thus forming a second line of the output. Likewise a third line is formed by a summing amplifier 42 (having weighting coefficients g, h and i) from the two-line delayed signal from delay 36 and the signals from one-element delays 38 and 40.

The local gradient signal $G_L$ is formed by combining the output signals of the summing amplifiers 26, 34 and 42 in a summing amplifier 44. The local gradient detector 3 therefore convolves the stream of signals S with an array of weights equal to:

| i | h | g |
|---|---|---|
| f | e | d |
| c | b | a |

In practice, eight such gradient detectors are used and the lettered weights are assigned numbers corresponding to the numbered weights heretofore described in connection with the set of arrays (2). (Consequently, certain of the lettered weights are zero and the corresponding signal value does not enter into the computation.)

Figure 6:
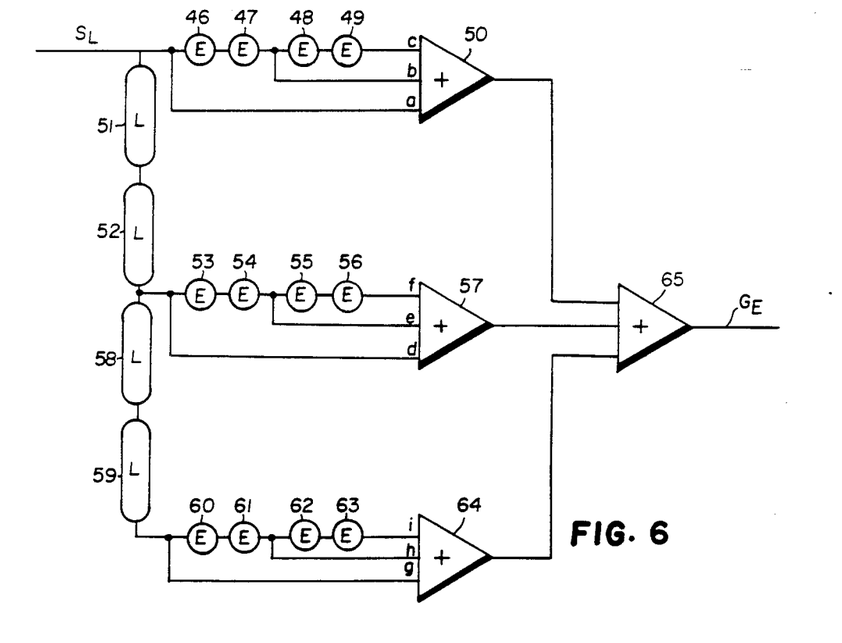
FIG. 6 is a circuit diagram of a network for implementing the extended gradient detector of FIGS. 2 and 3.

Circuit elements for implementing the extended gradient detector 8 are shown in the network of FIG. 6. Much as in FIG. 5, the extended gradient signal is generated in a summing amplifier 65 by combining the signals from the summing amplifiers 50, 57 and 64, which in turn combine the variously delayed signals from oneelement delays 46–49, 53–56, 60–63 and one-line delays 51, 52, 58 and 59. The additional delays, compared to FIG. 5, cause the collection of image signals over a larger array of image elements. The extended gradient detector 8 thus convolves the low-pass signal $S_L$ with an array of weights equal to

| i | 0 | h | 0 | g |
|---|---|---|---|---|
| 0 | 0 | 0 | 0 | 0 |
| f | 0 | e | 0 | d |
| 0 | 0 | 0 | 0 | 0 |
| c | 0 | b | 0 | a |

Eight such gradient detectors (or more, if off-centered averaging is employed per FIG. 3) are used and the weights are assigned numbers (some of which may be zero) corresponding to the numbered weights heretofore described in connection with the set of arrays (4). Extension of the network of FIG. 6 to collect image signals over yet larger arrays of image elements—as would be needed for the further extended gradient detector 102 of FIG. 4—will be apparent to anyone of ordinary skill in these arts.

Other gradient signal combinations may be useful in special situations. For example, the signal $G_E$ may include contributions from the local gradient detector as well as the extended gradient detector. Furthermore, many other ways of implementing the gradient detectors 3 and 8 will be apparent to anyone of ordinary skill in the art, some of which may possess efficiency and speed benefits not of direct concern in describing the principles of this invention.

The invention has been described in detail with particular reference to presently preferred embodiments thereof, but it will be understood that variations and modifications can be effected within the spirit and scope of the invention.

What is claimed is:

1. A method of image processing especially arranged to stress the interrelationship of various image gradients existing in an image, said method comprising the steps of:
    generating image signals representative of the light value of elements of the image;
    generating a first gradient signal in response to a combination of image signals representative of an image gradient over a first portion of the image;
    generating a second gradient signal in response to a combination of image signals representative of an image gradient over a second image portion that is greater than said first image portion;
    generating a composite signal from the combination of said first and second gradient signals; and
    modifying said image signals according to a noise-sensitive function that operates upon a characteristic of said composite signal.

2. The method as claimed in claim 1 wherein the steps of generating said first and second gradient signals comprise generating a) a local gradient signal in response to a combination of image signals that correspond to image elements distributed in nearby locations and b) an extended gradient signal in response to a combination of image signals that correspond to image elements distributed more distantly over the image.

3. The method as claimed in claim 1 wherein the step of generating the composite signal further comprises generating a composite signal that varies as a function of the difference between said first and second gradient signals.

4. The method as claimed in claim 3 wherein the step of modifying said image signals comprises comparing the magnitude of said composite signal to at least one predetermined threshold and then basing the image signal modification on the difference therebetween.

5. The method as claimed in claim 4 additionally comprising
    generating a third gradient signal obtained from image signals that correspond to image elements distributed over a third image portion greater than said first or second image portions; and
    generating a second composite signal that varies as a function of the difference between said third gradient signal and said second gradient signal.

6. The method as claimed in claim 5 in which the step of modifying said image signals further comprises comparing the magnitude of said second composite signal to at least one predetermined threshold and additionally basing the image signal modification on the difference between said second composite signal and its respective threshold.

7. A method of image processing especially arranged to prevent unwanted processing artifacts from degrading the reproduction of a processed image, said method comprising the steps of:
    generating image signals representative of the light value of elements of the image;
    forming the image signals into signal arrays aligned to image elements within areas of the image;
    generating a) a local gradient signal in response to local image gradient values obtained from signal arrays aligned to near-by image elements and b) an extended gradient signal in response to extended image gradient values obtained from signal arrays aligned to image elements more separated than the near-by elements, the local gradient signal being especially productive of unwanted processing artifacts when the value of the local gradient is similar to the value of the extended gradient;

generating a composite signal that interrelates the local and extended gradient signals so that processing artifacts due to similarities in image gradients are less prevalent; and modifying said image signals in response to the magnitude of the composite signal.

8. The method as claimed in claim 7 wherein the step of generating the composite signal comprises differencing said extended and local gradient signals.

9. The method as claimed in claim 8 wherein the step of modifying said image signals comprises comparing the magnitude of said extended and local gradient difference to at least one predetermined threshold and modifying the image signals based on the results of this comparison.

10. The method as claimed in claim 9 wherein the step of generating the local and extended gradient signals comprises convolving the image signals with at least two arrays of numerical weights, each array of weights forming the coefficients of a gradient detecting filter, one such array of weights corresponding to an extended gradient detecting filter and another such array corresponding to a local gradient detecting filter.

11. A method of image processing especially arranged to prevent the generation of unwanted artifacts during the processing of signals derived from image gradients within an image, said method comprising the steps of:

generating image signals representative of the light value of elements of the image;

combining the image signals into multi-sized signal arrays aligned to elements within multi-sized areas of the image;

generating a local gradient signal proportional to local image gradients obtained from differences between image signals included in the smaller of said multi-sized arrays;

generating an extended gradient signal proportional to extended image gradients obtained from differences between image signals included in the larger of said multi-sized arrays;

generating a composite signal from the difference between said local and extended gradient signals;

operating upon said composite signal in accordance with a noise reduction process in which the signal output is a non-linear function of its input; and replacing each image signal with a modified signal dependent at least in part upon the non-linear output of the noise reduction process.

12. In a method of processing an image for noise reduction comprising the steps of generating gradient signals proportional to a) local image gradients between nearby elements of the image and b) extended image gradients between more distant elements of the image; comparing the gradient signals to respective threshold levels separating a low amplitude signal predominantly representative of noise from a high amplitude signal predominantly representative of image detail; suppressing the gradient signals whenever their amplitude passes a respective threshold; and reconstructing the image from the remaining gradient signals; the improvement wherein the gradient signal proportional to the local image gradient is suppressed as a function of a) its respective threshold and b) the gradient signal proportional to the extended image gradient over the same elements generating said local image gradient.

13. The method as claimed in claim 12 wherein the noise reduction method further comprises the step of generating a gradient signal proportional to further extended image gradients between further distant elements of the image, the further improvement wherein the gradient signal proportional to the extended image gradient is suppressed as a function of a) its respective threshold and b) the gradient signal proportional to the further extended image gradient over the same elements generating said extended image gradient.

14. The method as claimed in claim 12 wherein said gradient signal proportional to the local image gradient is suppressed as a function of the difference between the gradient signals proportional to the local and extended image gradients.

* * * * *